United States Patent
Sheik-Bahae et al.

(10) Patent No.: US 12,158,569 B2
(45) Date of Patent: Dec. 3, 2024

(54) ASYMMETRIC CONFOCAL LASER BEAM CIRCULATOR

(71) Applicant: UNM RAINFOREST INNOVATIONS, Albuquerque, NM (US)

(72) Inventors: Mansoor Sheik-Bahae, Albuquerque, NM (US); Mingyang Zhang, Albuquerque, NM (US); Alexander Robert Albrecht, Albuquerque, NM (US)

(*) Notice: Subject to any disclaimer, the term of this patent is extended or adjusted under 35 U.S.C. 154(b) by 355 days.

(21) Appl. No.: 17/585,775

(22) Filed: Jan. 27, 2022

(65) Prior Publication Data
US 2022/0236546 A1    Jul. 28, 2022

Related U.S. Application Data

(60) Provisional application No. 63/148,719, filed on Feb. 12, 2021, provisional application No. 63/142,883, filed on Jan. 28, 2021.

(51) Int. Cl.
G02B 17/00 (2006.01)
G02B 17/08 (2006.01)
G02B 27/30 (2006.01)

(52) U.S. Cl.
CPC ....... *G02B 17/004* (2013.01); *G02B 17/0804* (2013.01); *G02B 27/30* (2013.01)

(58) Field of Classification Search
None
See application file for complete search history.

(56) References Cited

U.S. PATENT DOCUMENTS 6,392,753 B1 * 5/2002 Logunov .............. G01N 21/31
356/519

OTHER PUBLICATIONS

Huang, Yan et al. "A multi-pass pumping scheme for thin disk lasers with good anti-disturbance ability." Optics Express 23.4 (2015): 4605-4613.
Labate, Luca et al. "Intra-cycle depolarization of ultraintense laser pulses focused by off-axis parabolic mirrors." High Power Laser Science and Engineering 6 (2018): e32.
Lynn, Alex. "Off-axis parabolic mirrors offer near high reflectance." Optical Surfaces Limited. Website: <<https://www.electronicspecifier.com/products/optoelectronics/off-axis-parabolic-mirrors-offer-near-high-reflectance>>. (2020).
Yamane, I. et al. "Laser Recycler Using an Asymmetrical Con-Focal Cavity.".

* cited by examiner

*Primary Examiner* — Robert E. Tallman
(74) *Attorney, Agent, or Firm* — MH2 Technology Law Group LLP

(57) ABSTRACT

A laser beam circulator includes a first mirror and a second mirror. The first and second mirrors are symmetric with respect to an axis therebetween. The circulator also includes a sample that is substantially planar. The axis extends through the sample. The sample is oriented at an angle with respect to a plane that is perpendicular to the axis. The angle is from about 0.1° to about 10°. The circulator also includes a laser configured to emit a laser beam that circulates multiple times from the second mirror to the sample to the first mirror and back to the second mirror. The laser beam passes through the sample during each circulation. The sample absorbs a portion of the laser beam each time the laser beam passes through the sample.

19 Claims, 9 Drawing Sheets

ASYMMETRIC CONFOCAL LASER BEAM CIRCULATOR

CROSS-REFERENCE TO RELATED APPLICATIONS

This application claims priority to U.S. Provisional Patent Application No. 63/142,883, filed on Jan. 28, 2021, and to U.S. Provisional Patent Application No. 63/148,719, filed on Feb. 12, 2021. The entirety of both applications is incorporated by reference herein.

FIELD OF THE INVENTION

This invention relates generally to the field of laser beam circulators, and more particularly to asymmetric confocal laser beam circulators.

BACKGROUND OF THE INVENTION

In conventional optical systems, a laser beam may pass through a sample, at the same location on the sample, multiple times with minimal beam distortion. The conventional systems include an unstable cavity constructed from lenses and/or curved mirrors. The conventional systems also include a shifter, which may be a piece of transparent material or a combination of flat mirrors. The shifter may ensure that the pump beam does not return to its original launching point, which increases the number of times that the pump beam may pass through the sample.

SUMMARY

A laser beam circulator includes a first mirror and a second mirror. The first and second mirrors are symmetric with respect to an axis therebetween. The circulator also includes a sample that is substantially planar. The axis extends through the sample. The sample is oriented at an angle with respect to a plane that is perpendicular to the axis. The angle is from about 0.1° to about 10°. The circulator also includes a laser configured to emit a laser beam that circulates multiple times from the second mirror to the sample to the first mirror and back to the second mirror. The laser beam passes through the sample during each circulation. The sample absorbs a portion of the laser beam each time the laser beam passes through the sample.

In another embodiment, the circulator includes a first mirror and a second mirror. The first and second mirrors are substantially parabolic. The first and second mirrors are symmetric with respect to an axis therebetween. The circulator also includes a sample that is substantially planar. The axis extends through the sample. The circulator also includes a laser configured to emit a laser beam that circulates multiple times from the second mirror to the sample to the first mirror and back to the second mirror. The laser beam reflects off of the second mirror at a first angle. The laser beam contacts a focal point on the sample. The sample is tilted around the focal point such that the sample is oriented at a second angle with respect to a plane that is perpendicular to the axis. The second angle is from about 0.1° to about 10°. The laser beam passes through the sample during each circulation. The sample absorbs a portion of the laser beam each time the laser beam passes through the sample.

In yet another embodiment, the circulator includes a first mirror and a second mirror. The first and second mirrors are substantially planar. The circulator also includes a sample that is substantially planar. The circulator also includes a first lens positioned at least partially between the first mirror and the sample. The circulator also includes a second lens positioned at least partially between the second mirror and the sample. The circulator also includes a laser configured to emit a laser beam that circulates multiple times from the second mirror through the first lens to the sample, from the sample through the second lens to the first mirror, and from the first mirror back to the second mirror. The laser beam contacts a focal point on the sample. The sample is tilted around the focal point such that the sample is oriented at an angle with respect to a plane that is perpendicular to the axis. The angle is from about 0.1° to about 10°. The laser beam passes through the sample during each circulation. The sample absorbs a portion of the laser beam each time the laser beam passes through the sample.

Advantages of the embodiments will be set forth in part in the description which follows, and in part will be understood from the description, or may be learned by practice of the invention. The advantages will be realized and attained by means of the elements and combinations particularly pointed out in the appended claims. It is to be understood that both the foregoing general description and the following detailed description are exemplary and explanatory only and are not restrictive of the invention, as claimed. The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

Tilt-Induced Asymmetric Confocal Reflective Ring Circulator

The system and method described herein may include multi-pass circulator cavities that use an asymmetric confocal concept in transmission geometry and/or reflection geometry.

Figure 1:
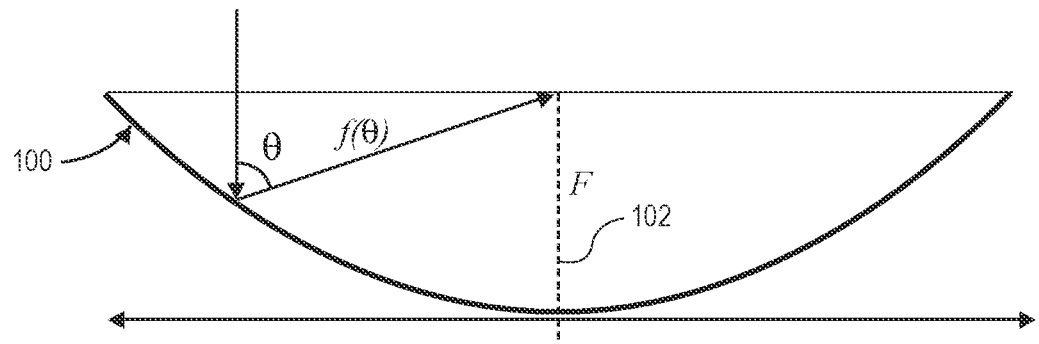
FIG. 1 illustrates a curved mirror, according to an embodiment.

FIG. 1 illustrates a curved mirror 100, according to an embodiment. The curved mirror 100 may be or include a parabolic mirror. More particularly, the mirror 100 may be part of a parabola. When the part of the mirror 100 is the central part of the parabola, this is referred to as an on-axis parabolic mirror. However, when the part of the mirror 100 is not the central part of the parabola, this is referred to as an OAPM. In one embodiment, the mirror 100 may be or include an off-axis parabolic mirror (OAPM).

The effective focal length of the curved mirror 100 may depend on the angle of incidence (θ) with respect to the symmetric axis 102 of the mirror 100. For example, for the parabolic mirror 100, the effective focal length versus angle (θ) can be written as:

$$f(\theta) = \frac{2F}{1 + \cos(\theta)}$$

where f(θ) represents the effective off-axis focal length, and F represents the on-axis (θ=0) focal length of the entire parabolic mirror. Thus, the effective focal length may be tuned by adjusting the incident angle (θ) rather than acquiring (or crafting) two nearly mismatched mirrors. The angle θ may be from about 10° to about 80°, about 20° to about 70°, or about 30° to about 60°.

OAPM-Based Ring Circulator

Figure 2:
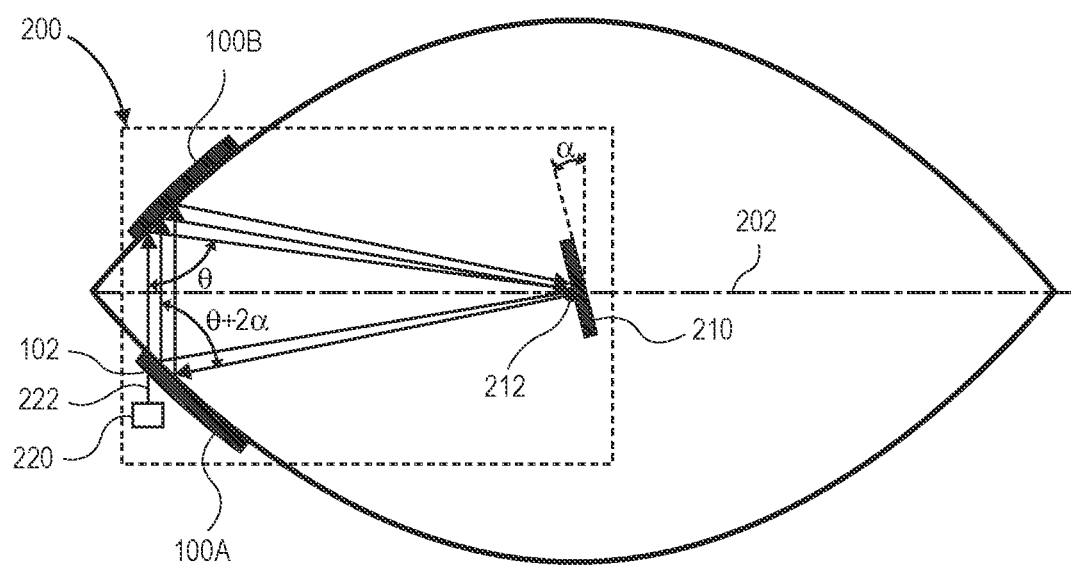
FIG. 2 illustrates a circulator, according to an embodiment.

FIG. 2 illustrates a circulator 200, according to an embodiment. The circulator 200 may also or instead be referred to as a circulator cavity or an OAPM-based ring circulator cavity. The circulator 200 may include two mirrors 100A, 100B that are symmetric with respect to an axis 202. In an embodiment, the mirrors 100A, 100B may be or include curved mirrors (e.g., OAPMs).

The circulator 200 may also include a sample 210. In one embodiment, the sample 210 may be planar (e.g., flat) and reflective (e.g., include a mirror). In another embodiment, a third mirror (not shown) may be positioned behind the sample 210 such that the sample 210 is positioned between the first mirror 100A and the third mirror, and between the second mirror 100B and the third mirror.

The circulator 200 may also include a laser 220 that is configured to emit a laser beam 222. In the embodiment shown, the laser beam 222 initially passes through an opening 102 in the first mirror 100A. The laser beam 222 then reflects off of the second mirror 100B at the incident angle (θ). The laser beam 222 then contacts (e.g., passes through) a spot 212 on the sample 210. The spot 212 may have a cross-sectional length (e.g., radius) from about 10 μm to about 10 mm. The radius may determine the spot size (e.g., area) of the beam 222 on the sample 210. As mentioned above, the sample 210 may be reflective, which causes the laser beam 222 to reflect off of the sample 210 toward the first mirror 100A. The foregoing has described one circulation of the laser beam 222 which is substantially triangular in this embodiment. The laser beam 222 may continue to circulate more times (three circulations/loops are shown), contacting (e.g., passing through) the spot 212 during each circulation. The sample 210 may be or include a weak absorber or an amplifier that may absorb a portion of a laser beam 222 each time the laser beam 222 passes through the sample 210. Thus, the circulator 200 may be referred to as a multi-pass circulator.

As may be seen, the axis 202 may extend through the sample 210. For example, the axis 202 may extend through the spot 212. However, the sample 210 may not be perpendicular to the axis 202. Rather, the sample 210 may be oriented at an angle α with respect to a line or plane that is perpendicular/normal to the axis 202. The angle α may be from about 0.1° to about 10°, about 0.3° to about 5°, or about 1° to about 3°. For example, the angle α may be just large enough so that the reflected beam on the mirror 100A (in its first pass) does not overlap with the incident beam, which is fed through the opening 102. Tilting the sample 210 around the spot 212 by the angle α may result in an asymmetric confocal cavity in a reflection geometry.

The configuration in FIG. 2 creates a tightly focused spot 212 at the sample 210. Ray tracing simulation shows that greater than about 40 passes into/through the sample 210 can be achieved.

Here, off-axis means that the angle θ is not zero (θ≈0 is on-axis). Off-axis may be used with variable θ because the sample 210 may be titled by a small angle α (different from θ) so that the reflecting the beam on the mirror 100A will be at an angle (θ+2α), which in turn makes the effective focal length of the two mirrors 100A, 100B different.

OAPM-Based Ring Circulator (Large Spot Size)

Figure 3:
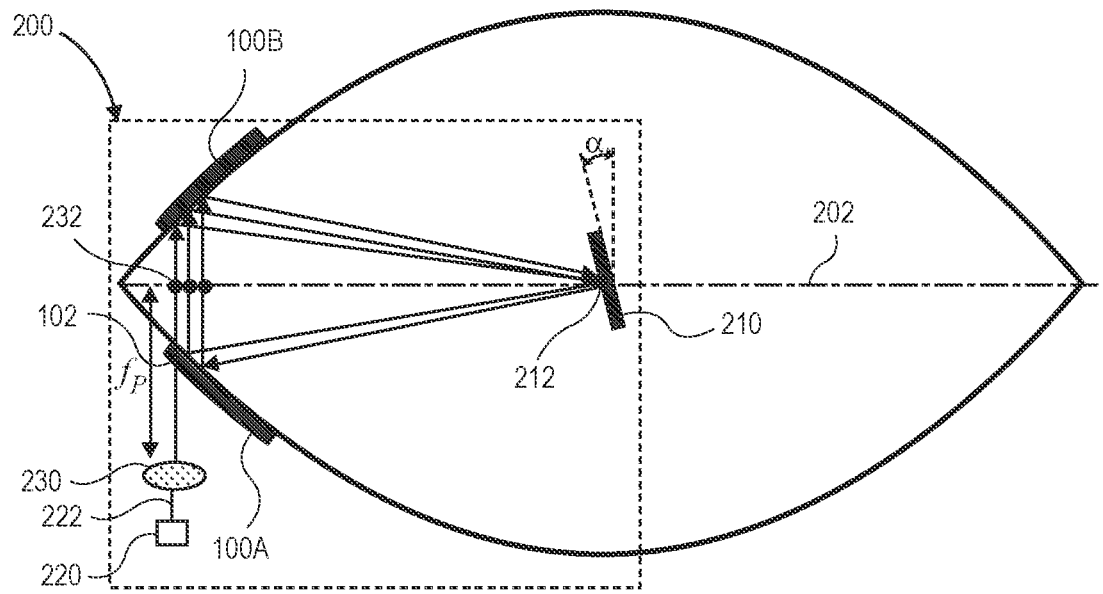
FIG. 3 illustrates the circulator with a controlled (e.g., larger) spot size on the sample, according to an embodiment.

FIG. 3 illustrates the circulator 200 with a controlled (e.g., larger) spot size 212, according to an embodiment. Ray tracing models show that by pre-focusing the beam 222 (e.g., using a lens 230), a collimated beam may be generated at the sample 210 in greater than about 30 passes with negligible distortion. More particularly, when a larger spot size is desired, the laser beam 222 may be initially focused by the lens 230 to an intermediate point 232 on the axis 202 before passing through the opening 102 in the mirror 100A. The laser beam 222 may then be recollimated by the mirror 100B. In subsequent circulations (e.g., round trips), the laser beam 222 may be focused by the mirror 100A and then recollimated by the mirror 100B. This may result in a larger spot size at the spot 212. While this geometry may not produce a perfectly re-collimated beam in every pass (i.e., the beam radius slightly changes in each roundtrip), it is surprisingly effective for multi-pass pumping where the spot size on the sample 210 is greater than a predetermined size (e.g., radius).

Aspheric Lens-Based Ring Circulator

Figure 4:
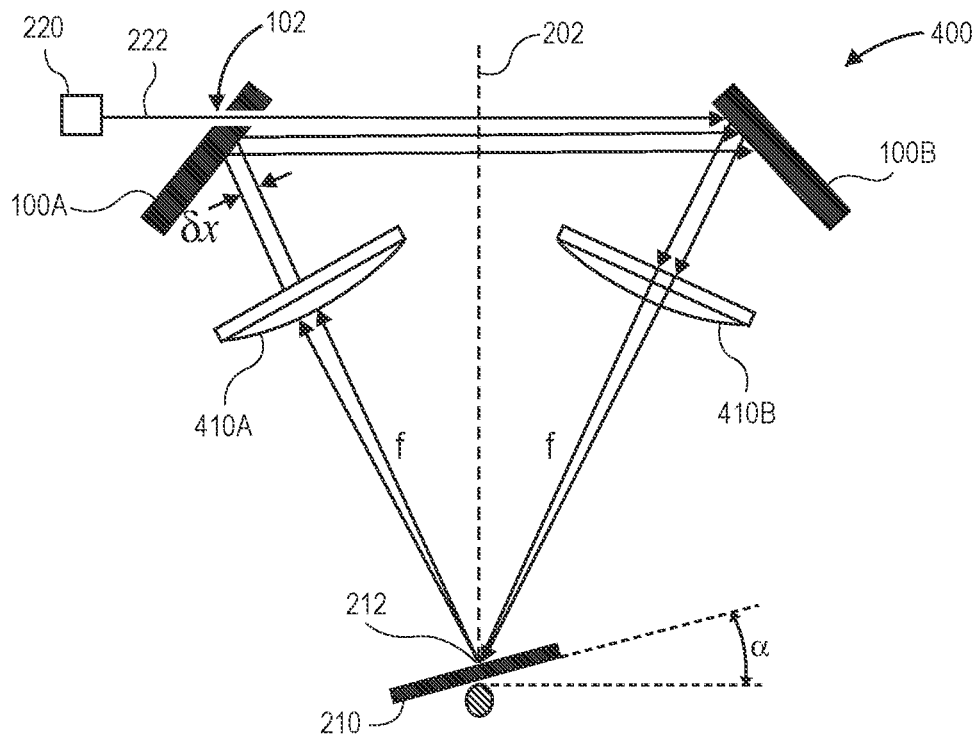
FIG. 4 illustrates another circulator, according to an embodiment.

FIG. 4 illustrates another circulator 400, according to an embodiment. The circulator 400 may be referred to as an aspheric lens-based ring circulator. The circulator 400 may include the mirrors 100A, 100B; however, in this embodiment, the mirrors 100A, 100B may be planar instead of curved. The circulator 400 may also include the sample 210, which may be oriented at the angle α with respect to normal to the axis 202.

The circulator 400 may also include one or more (e.g., two) lenses 410A, 410B. The lenses 410A, 410B may be aspheric lenses, meaning that the surface profiles are not portions of a sphere or cylinder. This surface profile can reduce or eliminate spherical aberration and also reduce other optical aberrations such as astigmatism, compared to a simple lens.

The combination of the planar mirrors 100A, 100B and the lenses 410A, 410B may replace the curved (e.g., parabolic) mirrors in FIG. 2. This may be a more convenient and less costly option to generate a multi-pass cavity. Although three reflective surfaces are shown (e.g., mirror 100A, mirror 100B, and sample 210), this configuration can be implemented with any odd number of reflective surfaces.

4f Aspheric Lens-Based Ring Circulator

Figure 5:
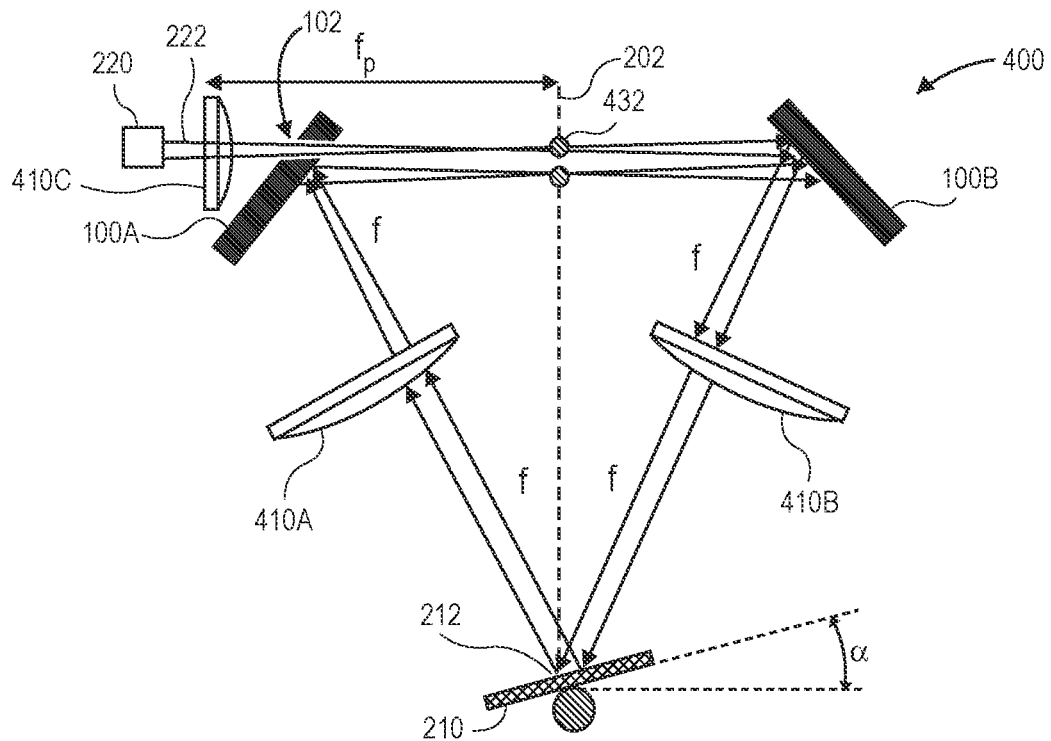
FIG. 5 illustrates the circulator with a controlled (e.g., larger) spot size on the sample 210, according to an embodiment.

FIG. 5 illustrates the circulator 400 with a controlled (e.g., larger) spot size on the sample 210, according to an embodiment. The spot size may or may not be tightly focused. To achieve this, the circulator 400 may be configured to implement an intermediate focus and re-collimation process. More particularly, when a larger spot size is desired, the laser beam 222 may be initially focused by the lens 410C to an intermediate point 432 on the axis 202 before passing through the opening 102 in the mirror 100A. The laser beam 222 may then be recollimated by the lens 410B. In subsequent circulations (e.g., round trips), the laser beam 222 may be focused by the lens 410A and then recollimated by the mirror 410B. This may result in a larger spot size at the spot 212. In contrast to the 2f embodiment shown in FIG. 4, the embodiment in FIG. 5 is 4f, where f represents the focal length of the aspheric lens. In addition, $f_p$ represents the distance between the lens 410C and the focal spot 432, which is also the focal distance of the focusing lens 410C. The lenses 410A-410C are positioned such that the intermediate focal point 432 is situated at a distance f from both lenses 410A and 410B.

Figure 6:
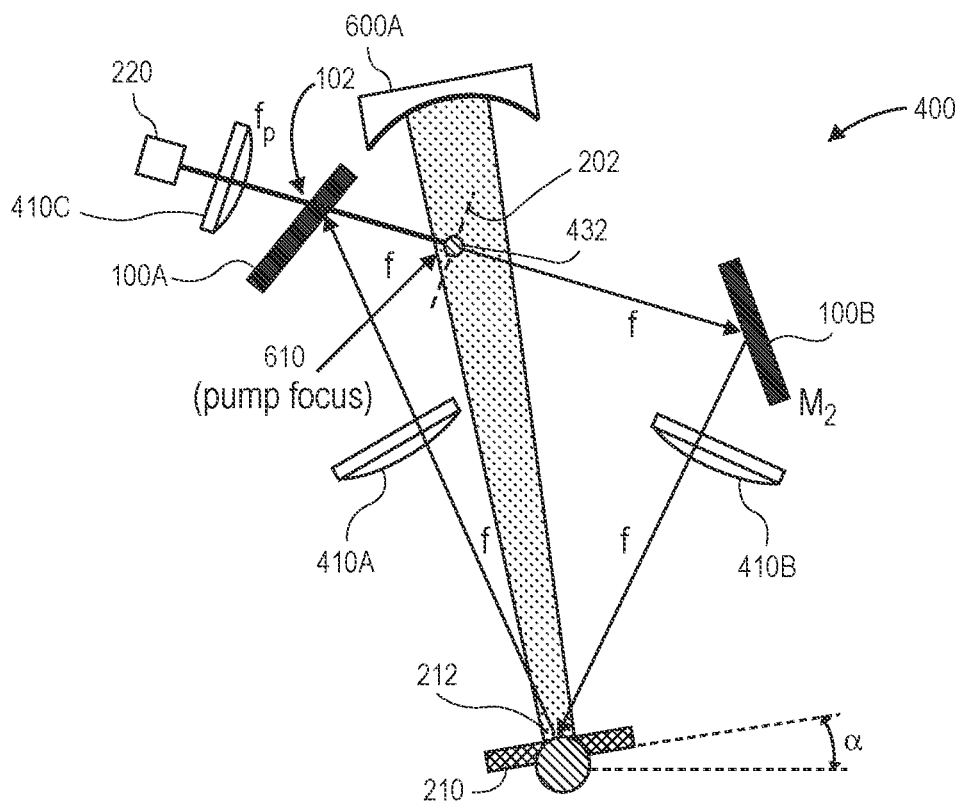
FIG. 6 illustrates the circulator and a laser cavity for the sample, according to an embodiment.

FIG. 6 illustrates the circulator 400 with another (e.g., curved) mirror 600A, according to an embodiment. In an example, the circulator 400 may be used to pump a thin disk laser. The position and/or orientation (e.g., angle) of one or more of the reflective surfaces (e.g., mirrors 100A, 100B, 600A, and/or sample 210) may be modified so that the input coupling mirror 100A is not too close to a pump focus 610 to avoid optical damage in high power pump operations.

Here, the laser cavity is defined at least partially by the sample 210 and the mirror 600A. The beam between the sample 210 and the mirror 600A will be formed if laser action occurs between the mirror 210 (e.g., mirror gain sample, pumped by this circulator 400) and the laser cavity mirror 600A. This beam is referred to as the laser cavity beam, which may not be part of the circulator 400. Rather, it is the intracavity laser beam for the resonator formed by the gain chip 210 and the external cavity mirror 600A.

Multi-Pump Beam Capability

Figure 7:
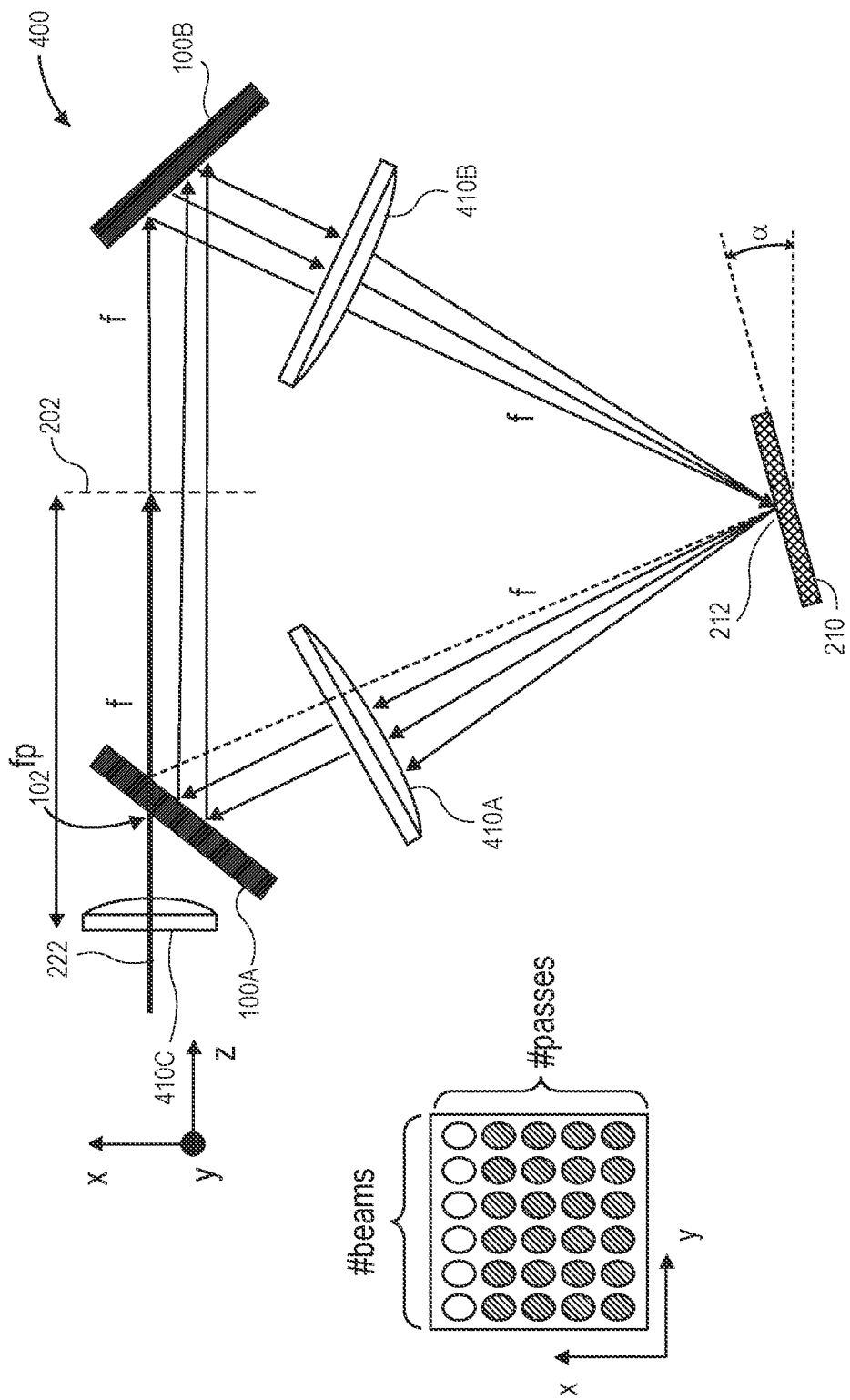
FIG. 7 illustrates the aspheric lens-based ring circulator with a plurality of beams, according to an embodiment.

FIG. 7 illustrates the aspheric lens-based ring circulator 400 with a plurality of beams 222, according to an embodiment. The beams 222 may (e.g., simultaneously) be launched onto the sample 210 through the input coupling mirror 400A. This may be used to pump the gain medium of a disk laser (sample 210) with multiple pump beams to achieve high-power outputs.

Parabolic Asymmetric Confocal Cavities (PACC)

An asymmetric confocal cavity may be generated using on-axis and/or off-axis parabolic mirrors. As mentioned above, the term "off-axis" refers to when a portion of the parabolic mirror away from the axis is cut and used. This term is not used when the whole parabolic mirror is used, even though the rays incident and reflected are away from the axis and in some cases are significantly off-axis. The two parabolic mirrors in FIG. 8 are on-axis parabolic mirrors with a hole in the center.

OAPM-Based Asymmetric Confocal Ring Circulator

Figure 8:
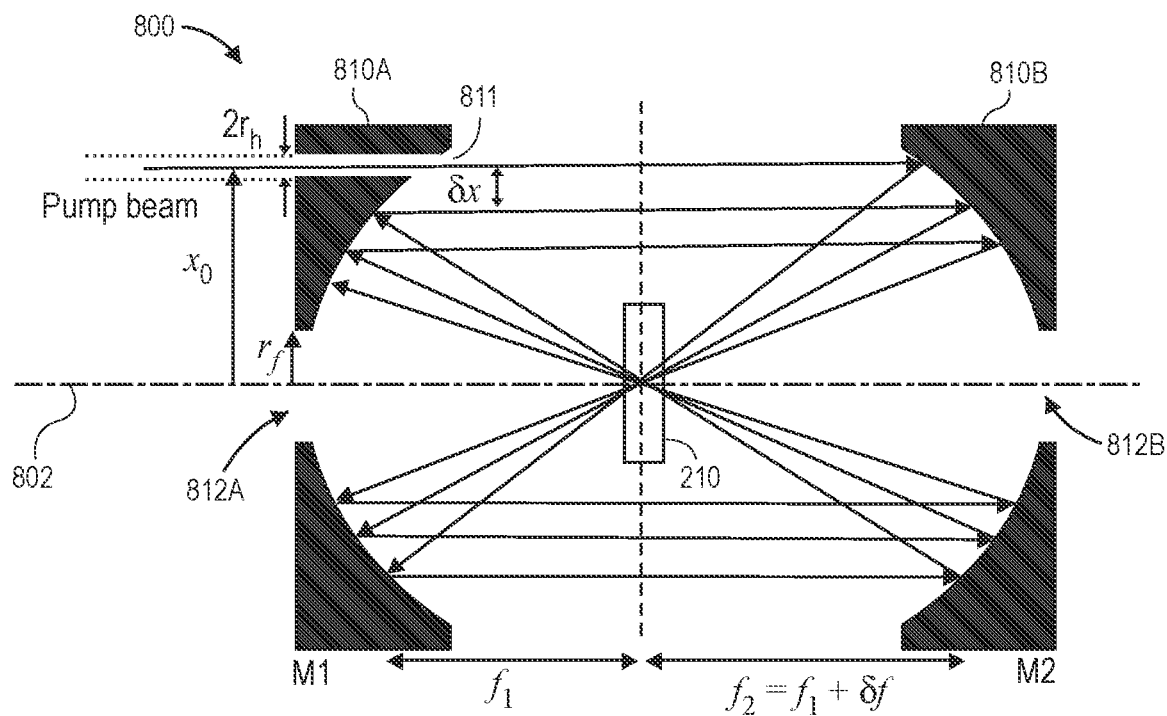
FIG. 8 illustrates another circulator, according to an embodiment.

FIG. 8 illustrates another circulator 800, according to an embodiment. In this embodiment, the sample 210 is not reflective and does not have a mirror attached to it. The mirrors 810A, 810B may be or include parabolic mirrors that are symmetric to one another with respect to an axis 802. In addition to the hole in the mirror 810A through which the laser beam 222 initially passes, the mirrors 810A, 810B may each also have a (e.g., central) hole 812A, 812B formed therethrough. The central holes 812A, 812B may be used to allow another laser beam (e.g., formed by an external cavity similar to FIG. 6) to pass through the multi-pass pumped sample 210. The axis 802 may extend through the sample 210 and the holes 812A, 812B. The circulator 800 in FIG. 8 may be used to pump the sample 210, which may be or include a laser gain medium.

Figure 9:
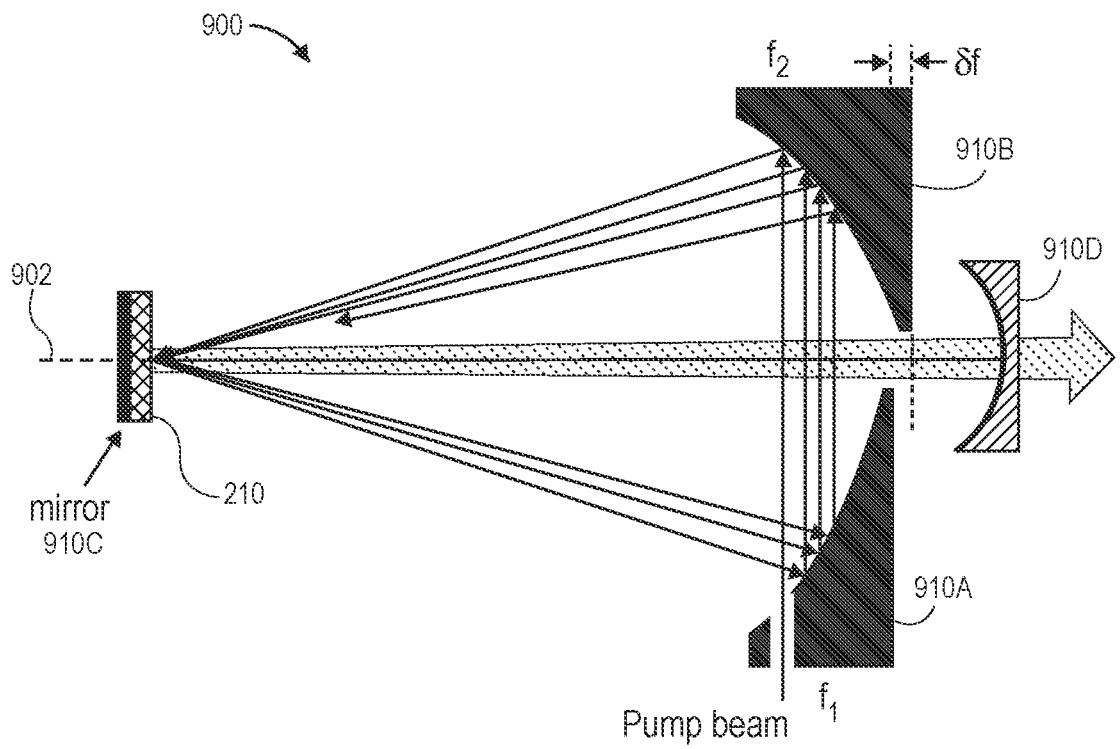
FIG. 9 illustrates another circulator, according to an embodiment.

FIG. 9 illustrates a reflective (e.g., three mirror) ring circulator 900, according to an embodiment. This may include two (e.g., off-axis parabolic) mirrors 910A, 910B that are symmetric to one another with respect to an axis 902. However, the mirrors 910A, 910B may be laterally offset from one another by a distance Of in a direction that is parallel to the axis 902. In some embodiments, a third mirror 910C may be positioned proximate to (e.g., behind) the sample 210. The circulator 900 may be defined at least partially by the mirrors 910A-910C. A laser cavity may be defined at least partially by the mirrors 910C and 910D. This is similar to embodiment in FIG. 6.

Multi-Beam PACC

Figures 10A, 10B:
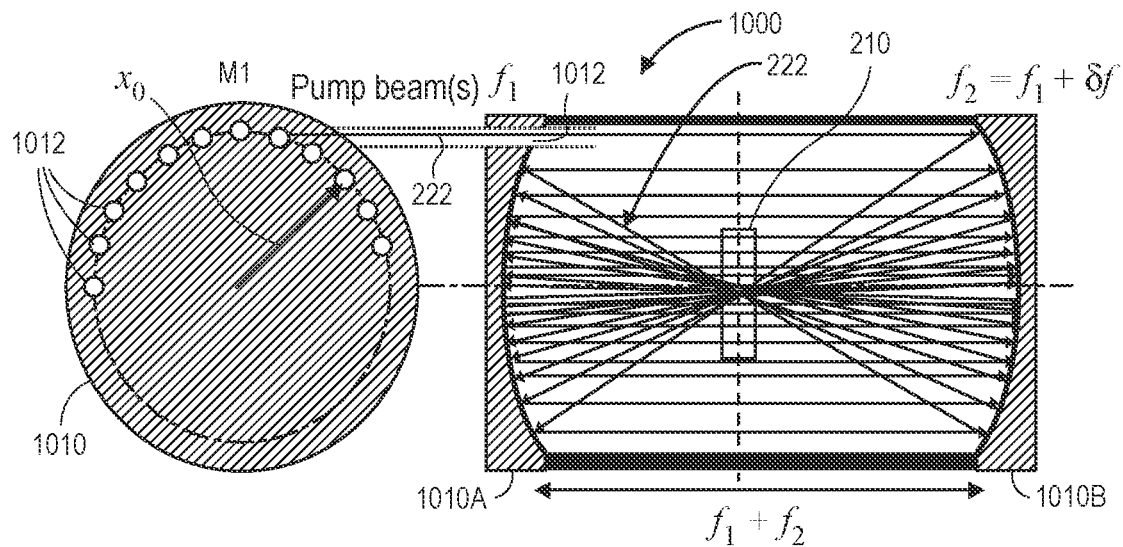
FIG. 10A illustrates a side view of a circulator with an on-axis PACC geometry.
FIG. 10B illustrates an end view of the circulator, according to an embodiment.

FIG. 10A illustrates a side view of a circulator 1000 with an on-axis PACC geometry, and FIG. 10B illustrates an end view of the circulator 1000, according to an embodiment. The design shown in FIGS. 10A and 10B allows for launching multiple pump beams 222 through holes 1012 in the mirror 1010A. Alternatively, the multiple pump beams 222 may pass outside the periphery of the mirror 1010A if the mirror 1010A has a smaller size (e.g., diameter). The circulator 1000 in FIGS. 10A and 10B may be used for pumping the sample 210 at the focus or a gas-filled cell for spectroscopy. The number of beams $N_{beam}$ that can be launched can be estimated as:

$$N_{beam} \approx \pi \frac{f_2}{\delta f} = 10 - 30$$

where $f_2$ represents the focal length of the parabolic mirror 1010B, and $\delta f = f_2 - f_1$ represents the asymmetry in the focal lengths between mirrors 1010A and 1010B.

Figures 11A, 11B:
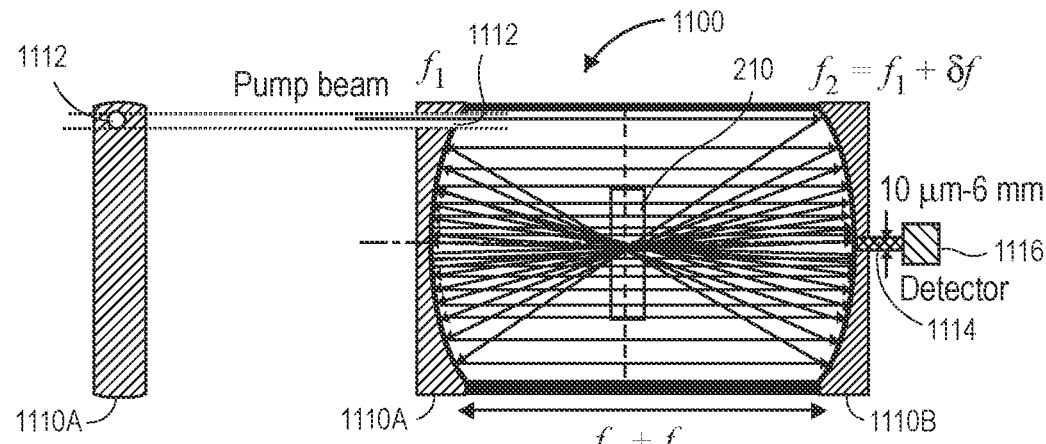
FIG. 11A illustrates a side view of another circulator with an on-axis PACC geometry.
FIG. 11B illustrates an end view of the circulator, according to an embodiment.

FIG. 11A illustrates a side view of another circulator 1100 with an on-axis PACC geometry, and FIG. 11B illustrates an end view of the circulator 1100, according to an embodiment. The circulator 1100 may include two (e.g., parabolic) mirrors 1110A, 1110B. The mirror 1110A may have a small hole 1112 formed therethrough. The hole 1112 may be or include an optical fiber therein. The mirror 1110B may have a small hole 1114 formed therethrough. The hole 1114 may be or include an optical fiber therein. The circulator 1100 can be used for transmission spectroscopy in gases by coupling the laser out of the cavity through the hole 1114 in the mirror 1110B, and measuring the transmitted light with a detector 1116, according to an embodiment.

Figures 12A, 12B:
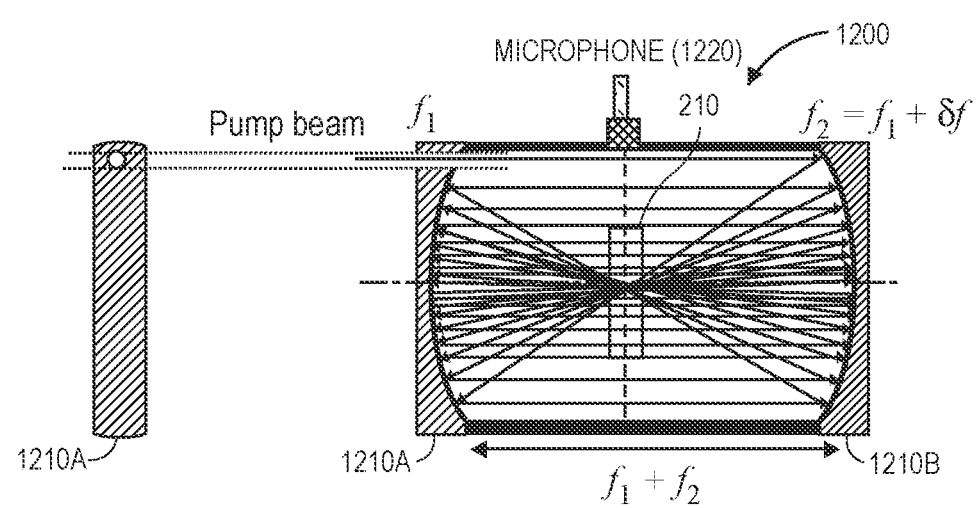
FIG. 12A illustrates a side view of another circulator.
FIG. 12B illustrates an end view of the circulator, according to an embodiment.

FIG. 12A illustrates a side view of another circulator 1200, and FIG. 12B illustrates an end view of the circulator 1200, according to an embodiment. The circulator PACC 1200 may include a microphone 1220 that can detect the sound generated during absorption. As a result, the circulator 1200 can be used for photo-acoustic spectroscopy in gases and/or aerosols.

Figure 13:
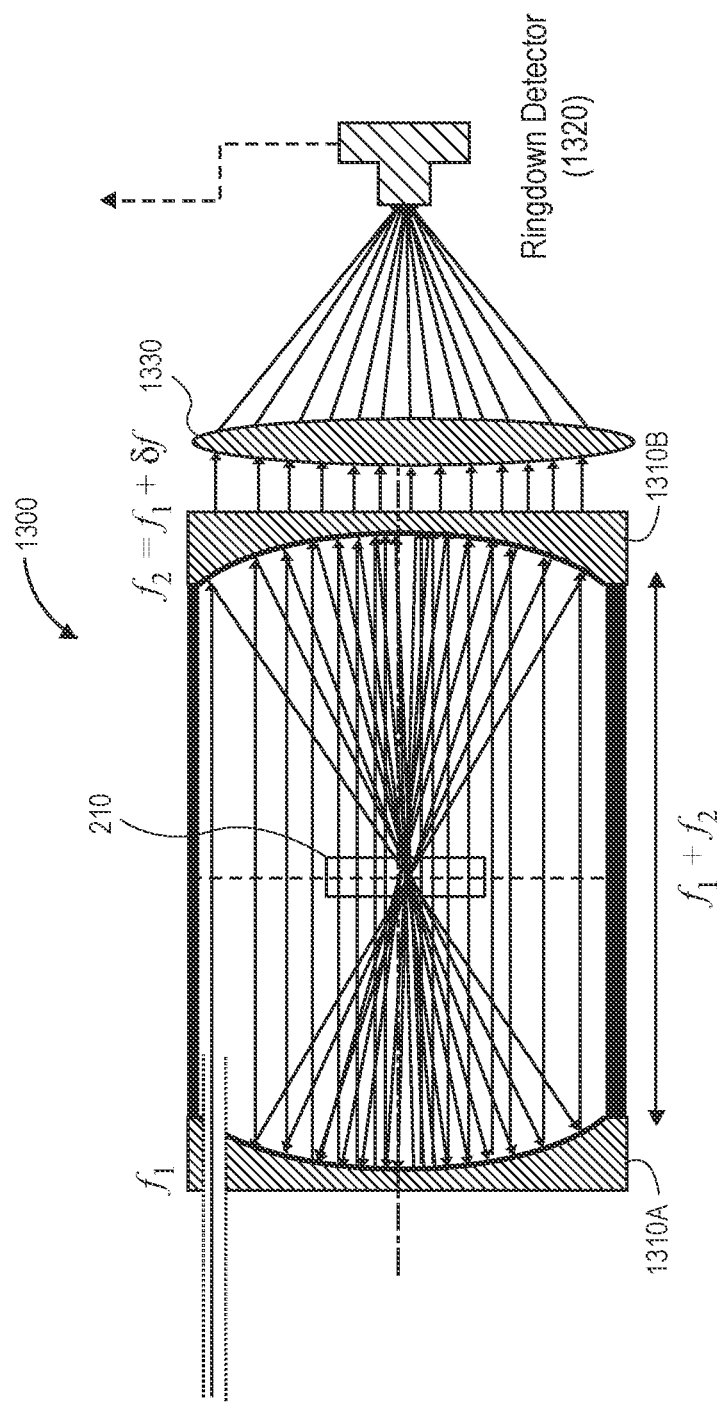
FIG. 13 illustrates a side view of another circulator, according to an embodiment.

FIG. 13 illustrates a side view of another circulator 1300, according to an embodiment. The circulator 1300 includes a ringdown detector 1320 such as an avalanche photodiode (APD) that may be configured to construct a non-resonant circulator for cavity ring-down spectroscopy (CRDS) where a short laser pulse with nanosecond(s) duration is launched through the hole, and each pass it is attenuated by the medium (e.g., gas) inside the cavity, leaked through mirror 1310B. The transmitted time histogram of the laser, detected by the detector 1320, may then exhibit an exponential decay with a time constant that is inversely proportional to the absorbance of the specimen. As a result, the circulator 1300 may be used in cavity ring-down spectroscopy. A lens 1330 may be used to focus the light onto the detector 1320.

Figures 14A, 14B, 14C:
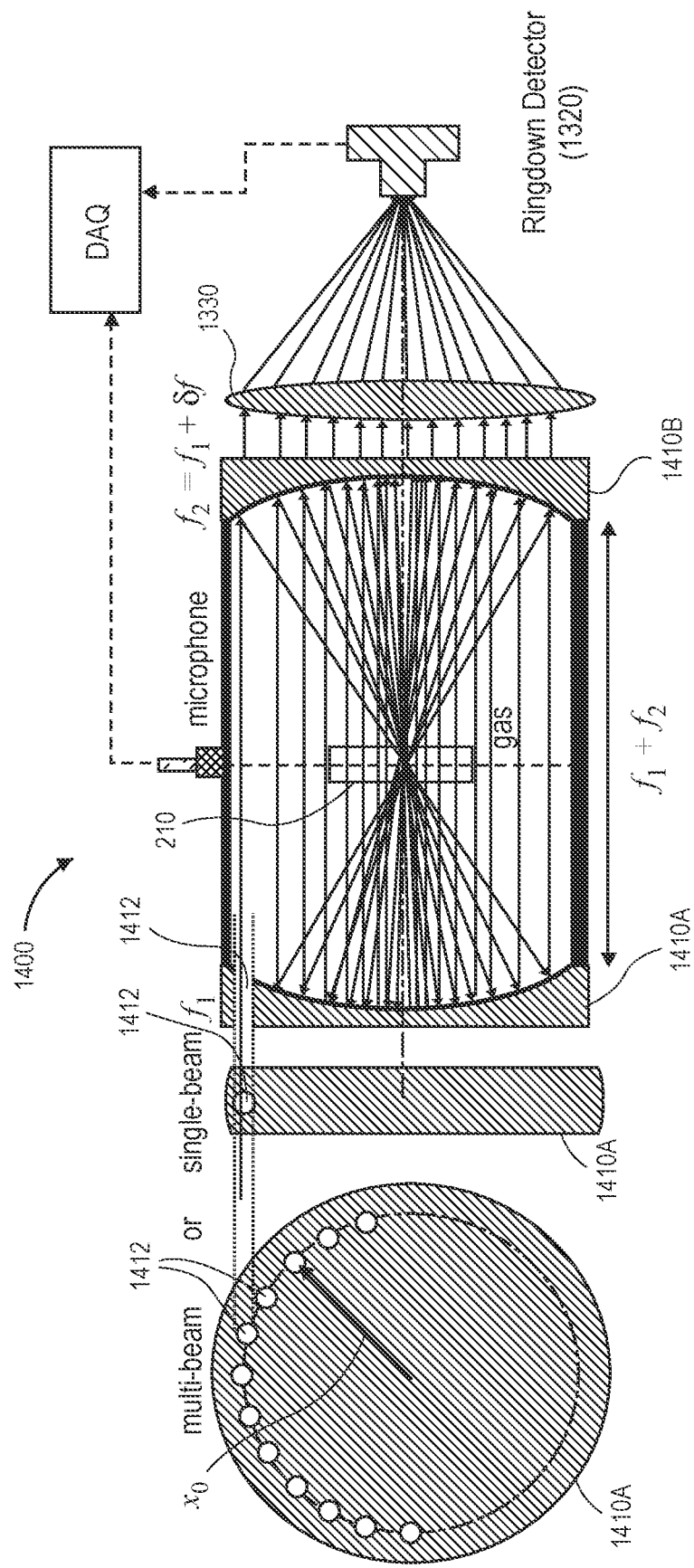
FIG. 14A illustrates a side view of another circulator.
FIG. 14B illustrates an end view of the circulator in a single-beam configuration.
FIG. 14C illustrates an end view of the circulator in a multi-beam configuration, according to an embodiment.

FIG. 14A illustrates a side view of another circulator 1400, FIG. 14B illustrates an end view of the circulator 1400 in a single-beam configuration, and FIG. 14C illustrates an end view of the circulator 1400 in a multi-beam configuration, according to an embodiment. The circulator 1400 includes a microphone 1220 as well as the ringdown detector 1320. As a result, the circulator 1400 can be used in (e.g., simultaneous) photoacoustic and ringdown spectroscopy. This may be particularly useful in measuring the extinction coefficient in aerosols because it can differentiate between absorptive and scattering losses. More particularly, the photoacoustic signal may be sensitive to absorptive while ringdown measures total loss in the cell.

Figure 15:
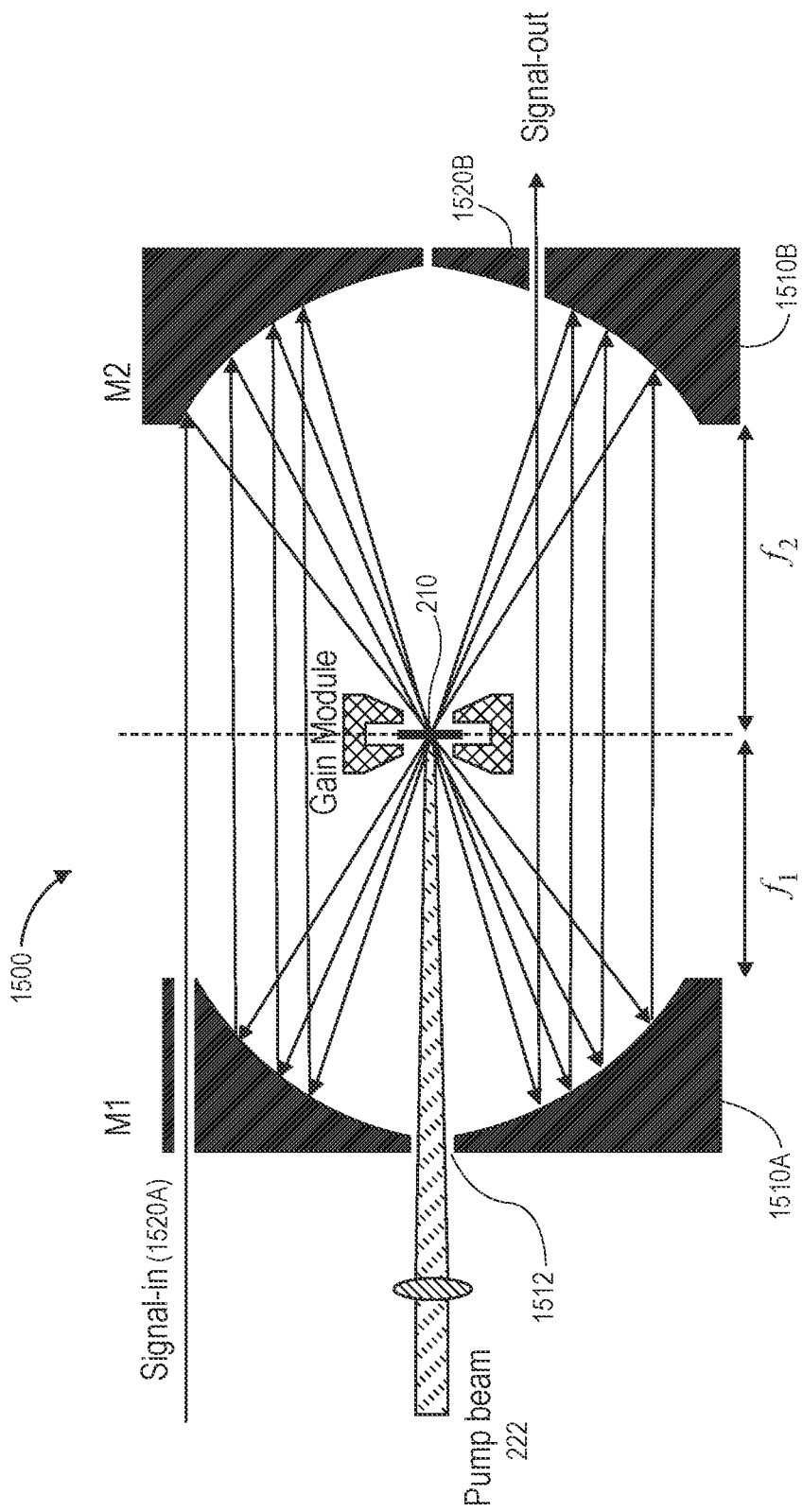
FIG. 15 illustrates a side view of another circulator and a gain module (e.g., a heatsink and/or heat spreader), according to an embodiment.

FIG. 15 illustrates a side view of another circulator 1500, according to an embodiment. The circulator 1500 may be used in a multi-pass amplifier. Here, a pump beam 222 creates gain in the sample (e.g., a disk) 210, while a signal 1520 entering through a hole 1520A in the mirror 1510A is amplified after multiple passes in the gain medium 210 before exiting through a hole 1520B in the mirror 1510B.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A laser beam circulator, comprising:
   a first mirror;
   a second mirror, wherein the first and second mirrors are symmetric with respect to an axis therebetween;
   a sample that is substantially planar, wherein the axis extends through the sample, wherein the sample is reflective or has a third mirror coupled to a backside thereof, wherein the sample is oriented at an angle with respect to a plane that is perpendicular to the axis, and wherein the angle is from about 0.1° to about 10°; and
   a laser configured to emit a laser beam that passes through an opening in the first mirror before initially contacting the second mirror, wherein the laser beam circulates multiple times from the second mirror to the sample to the first mirror and back to the second mirror, wherein the laser beam passes through the sample during each circulation, and wherein the sample absorbs a portion of the laser beam each time the laser beam passes through the sample.

2. The laser beam circulator of claim 1, wherein the first and second mirrors are substantially parabolic.

3. The laser beam circulator of claim 2, wherein the laser beam contacts a spot on the sample, and wherein the sample is tilted around the spot such that the sample is oriented at the angle with respect to the axis.

4. The laser beam circulator of claim 3, wherein the laser beam also reflects off of the second mirror at the angle.

5. The laser beam circulator of claim 1, wherein the first and second mirrors are substantially planar.

6. The laser beam circulator of claim 5, further comprising:
   a first lens positioned at least partially between the first mirror and the sample; and
   a second lens positioned at least partially between the second mirror and the sample,
   wherein the laser beam circulates multiple times from the second mirror through the first lens to the sample, from the sample through the second lens to the first mirror, and from the first mirror back to the second mirror, wherein the laser beam contacts a spot on the sample, and wherein the sample is tilted around the spot such that the sample is oriented at the angle with respect to the axis.

7. The laser beam circulator of claim 1, further comprising a lens configured to focus the laser beam to an intermediate point on the axis before initially contacting the second mirror, wherein the second mirror then recollimates the laser beam.

8. The laser beam circulator of claim 7, wherein the first mirror collimates the laser beam and the second mirror refocuses the laser beam in subsequent circulations.

9. The laser beam circulator of claim 1, wherein the laser beam circulator does not comprise a shifter.

10. A laser beam circulator, comprising:
a first mirror;
a second mirror, wherein the first and second mirrors are substantially parabolic;
a sample that is substantially planar; and
a laser configured to emit a laser beam that circulates multiple times from the second mirror to the sample to the first mirror and back to the second mirror, wherein the laser beam reflects off of the second mirror at a first angle, wherein the laser beam contacts a spot on the sample, wherein the sample is tilted around the spot such that the sample is oriented at a second angle with respect to a plane that is perpendicular to the axis, wherein the second angle is from about 0.1° to about 10°, wherein the laser beam passes through the sample during each circulation, and wherein the sample absorbs a portion of the laser beam each time the laser beam passes through the sample.

11. The laser beam circulator of claim 10, further comprising a lens configured to focus the laser beam to an intermediate point on the axis before initially contacting the second mirror, wherein the second mirror then recollimates the laser beam.

12. The laser beam circulator of claim 11, wherein the lens causes an area of the spot to increase.

13. The laser beam circulator of claim 11, wherein the first mirror collimates the laser beam, and the second mirror focuses the laser beam in subsequent circulations.

14. The laser beam circulator of claim 10, wherein the first and second mirrors are symmetric with respect to an axis therebetween, and wherein the axis extends through the sample and the focal point.

15. A laser beam circulator, comprising:
a first mirror;
a second mirror, wherein the first and second mirrors are substantially planar;
a sample that is substantially planar, wherein the axis extends through the sample;
a first lens positioned at least partially between the first mirror and the sample;
a second lens positioned at least partially between the second mirror and the sample; and
a laser configured to emit a laser beam that circulates multiple times from the second mirror through the first lens to the sample, from the sample through the second lens to the first mirror, and from the first mirror back to the second mirror, wherein the laser beam contacts a spot on the sample, wherein the sample is tilted around the spot such that the sample is oriented at an angle with respect to a plane that is perpendicular to the axis, wherein the angle is from about 0.1° to about 10°, wherein the laser beam passes through the sample during each circulation, and wherein the sample absorbs a portion of the laser beam each time the laser beam passes through the sample.

16. The laser beam circulator of claim 15, wherein the first and second lenses comprise aspheric lenses.

17. The laser beam circulator of claim 15, wherein the first and second mirrors are symmetric with respect to an axis therebetween.

18. The laser beam circulator of claim 15, further comprising a third lens configured to focus the laser beam to an intermediate point on the axis before initially contacting the second mirror, wherein the second mirror then recollimates the laser beam.

19. The laser beam circulator of claim 18, wherein the lens causes an area of the spot to increase, and wherein the first mirror collimates the laser beam, and the second mirror focuses the laser beam in subsequent circulations.

* * * * *

UNITED STATES PATENT AND TRADEMARK OFFICE
CERTIFICATE OF CORRECTION

PATENT NO. : 12,158,569 B2
APPLICATION NO. : 17/585775
DATED : December 3, 2024
INVENTOR(S) : Sheik-Bahae et al.

Page 1 of 1

It is certified that error appears in the above-identified patent and that said Letters Patent is hereby corrected as shown below:

In the Specification

Column 1, after the title, please insert therefor:
--STATEMENT OF GOVERNMENT INTEREST
This invention was made with government support under contract no. FA9550-16-1-0362 awarded by the Air Force Office of Scientific Research. The government has certain rights in the invention.--

Signed and Sealed this
Eleventh Day of March, 2025

Coke Morgan Stewart
*Acting Director of the United States Patent and Trademark Office*